United States Patent [19]

Smart

[11] Patent Number: 4,617,118
[45] Date of Patent: Oct. 14, 1986

[54] ASSEMBLIES OF CONJOINED PARTS

[75] Inventor: Michael F. Smart, Glamorgan, Scotland

[73] Assignee: Fram Industrial Ltd., Glamorgan, Scotland

[21] Appl. No.: 715,717

[22] Filed: Mar. 25, 1985

[51] Int. Cl.$^4$ ............................................. B01D 29/28
[52] U.S. Cl. ......................... 210/232; 210/DIG. 17; 403/320; 403/315; 285/81; 411/327
[58] Field of Search ............... 411/329, 328, 327, 326; 210/232, 238, DIG. 17; 403/320, 315, 348, 12, 13, 14; 215/330, 316; 285/81, 82; 220/66

[56] References Cited

U.S. PATENT DOCUMENTS

| | | | |
|---|---|---|---|
| 688,867 | 12/1901 | Kocher | 411/327 |
| 1,101,461 | 6/1914 | Maynard | 411/330 |
| 3,069,187 | 12/1962 | Collins et al. | 285/82 X |
| 3,390,799 | 7/1968 | Szekely | 411/329 X |
| 3,719,281 | 3/1973 | Dieringer | 210/DIG. 17 |
| 4,106,659 | 8/1978 | Dent et al. | 220/73 X |

FOREIGN PATENT DOCUMENTS

| | | |
|---|---|---|
| 961786 | 6/1975 | Canada ............................... 220/66 |
| 225389 | 12/1924 | United Kingdom . |
| 265450 | 2/1927 | United Kingdom . |
| 370629 | 4/1932 | United Kingdom . |
| 743734 | 1/1956 | United Kingdom . |
| 854975 | 11/1960 | United Kingdom . |
| 987685 | 3/1965 | United Kingdom . |
| 1356778 | 6/1974 | United Kingdom . |
| 1418021 | 12/1975 | United Kingdom . |
| 1475543 | 6/1977 | United Kingdom . |

*Primary Examiner*—Cornelius J. Husar
*Assistant Examiner*—Joseph A. Fischetti
*Attorney, Agent, or Firm*—Ken C. Decker; William N. Antonis

[57] ABSTRACT

In a screw mounting arrangement for a plastics moulded filter or a coalescer element end cap to a base the base is provided with a serrated track which a locating member is engageable with when the filter or coalescer element is screwed onto the base such as to prevent loosening thereof due to vibration.

13 Claims, 5 Drawing Figures

U.S. Patent  Oct. 14, 1986  Sheet 1 of 2  4,617,118
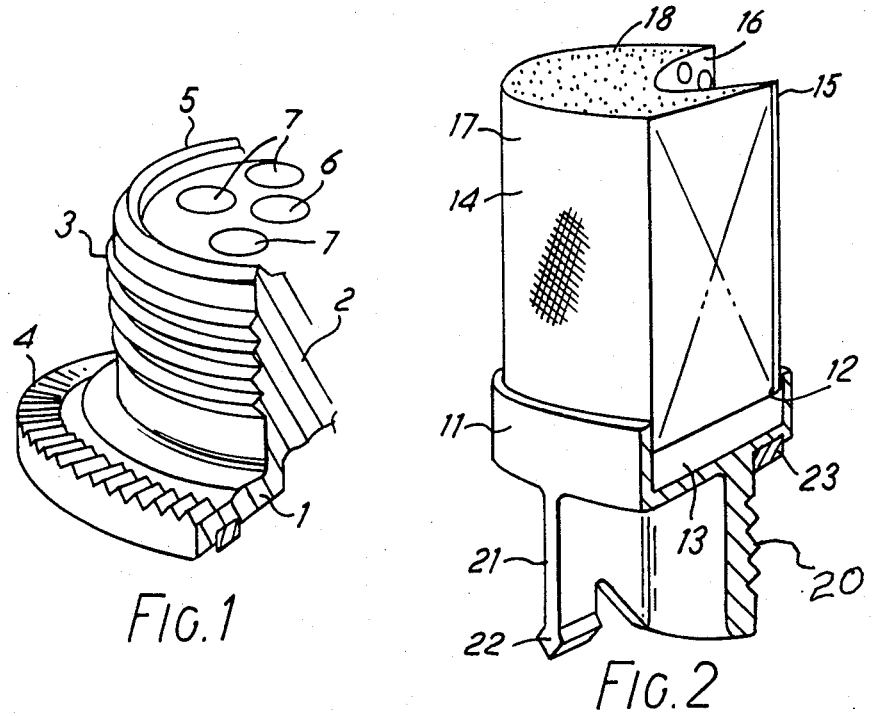
FIG. 1
FIG. 2
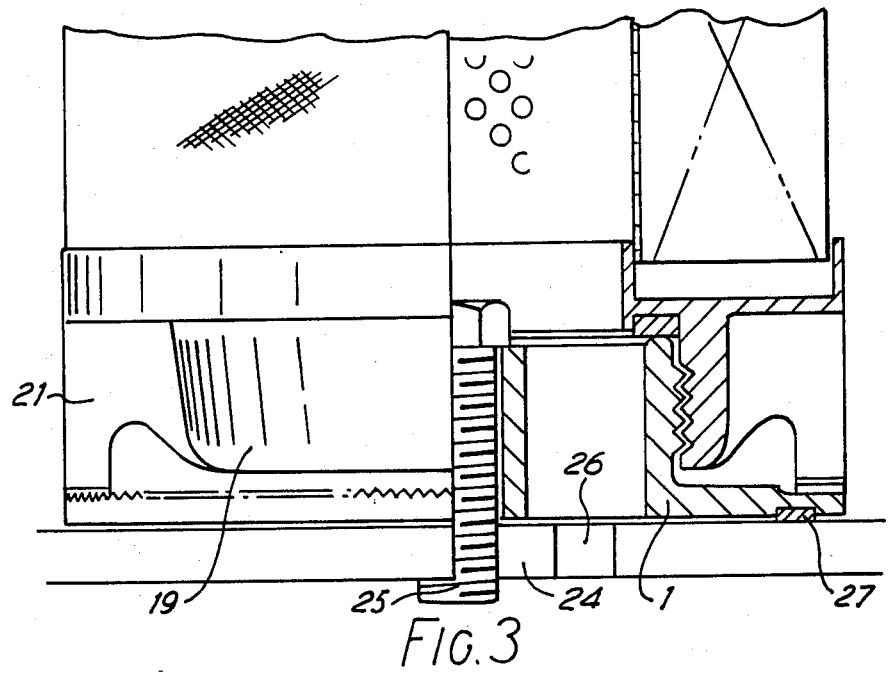
FIG. 3

ASSEMBLIES OF CONJOINED PARTS

This invention relates to assemblies of conjoined parts and related especially but not exclusively to screw threaded assembly of a filter cartridge or filter and coalescer cartridge to a mounting and connecting part.

BACKGROUND OF THE INVENTION

In large filter/separator installations subjected to vibration such as in marine applications and in mobile and static installation also subject to vibration it is proposed to mount replaceable fuel or lubricating oil filter cartridges on screw-mounting and connecting parts provided within a cylindrical enclosure whereby fluid can flow radially inwardly or outwardly through a generally cylindrical filter element the interior and exterior of which are mutually sealed for fluid flow except through the filter element itself. In such an installation it is important to ensure that vibration does not result in loosening of the filter cartridge on its screw base since such loosening can result in a seal between the interior and the exterior of the element being bypassed by flow other than through the element itself. The present invention seeks to prevent such loosening even in cases where a mounting spigot with a screw thread is formed of relatively soft material such as moulded plastics.

According to the present invention there is provided an assembly of conjoined parts comprising a mounting part and a mountable part said parts having complimentary means operable to conjoin them by relative rotation of the parts wherein one said part is provided with at least one resiliently deflectable locating member engageable with a locating track of the other part to resist relative rotation.

In a preferred embodiment of the invention the second mountable part carries the locating member and the mounting part carries the locating track the locating track extending arcuately around and concentric with a screw-threaded portion such that upon screwing the parts together the locating member moves increasingly into engagement with the track.

The locating track may be arranged to extend in an axial direction such that substantial engagement between the locating member and the track is maintained over a range of relative axial positions of the parts or it may be arranged to extend radially to be met by axial movement of the locating member.

In order that the invention may be more clearly understood and readily carried into effect the same will be further described by way of example with reference to the accompanying drawing of which

BRIDF DESCRIPTION OF THE DRAWING

FIG. 1 illustrates a part sectional view of a mounting part,

FIG. 2 illustrates a part sectional view of a mountable part in the form of a fluid filter cartridge, FIG. 3 illustrates a part sectional view of an assembly together with the parts of FIG. 1, FIG. 2 and FIGS. 4 and 5 illustrate alternative matching parts.

DETAILED DESCRIPTION

Figure 4:
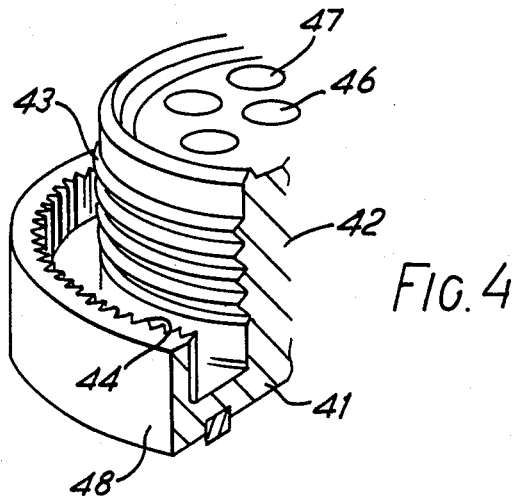

Referring to FIG. 1, the mounting part comprises a generally circular flange denoted by reference 1 with an upwardly extending generally cylindrical spigot denoted by reference 2 which is screw-threaded at 3 and the flange 1 is provided with a serrated track 4 with approximately symetrical saw tooth shaped serrations. The mounting part 1 is moulded of plastics material and is provided with an upward narrow section 5 for sealing engagement with a rubber gaskt 23 to be referred to below and a concentric axial bore 6 to receive a mounting bolt. The aperture 6 is surrounded further by a plurality of passages 7 providing for fluid flow to the interior of a filter element mounted thereon.

Referring to FIG. 2, a filter element for mounting on the mounting part 1 of FIG. 1 is provided with a moulded, generally annular plastics end cap 11 within an upper annular recess 12 of which the annular and lower end of a generally cylindrical filter element 14 is sealed by a sealing compound at 13. The interior of the filter element is provided with an inner metal supporting sleeve 15 having a large number of holes 16 through which unrestricted fluid flow can take place. The outer surface 17 is similarly provided with a constraining metal mesh for containing filtering material 18. This material may be felt, fine mesh or pleated paper or a combination of these for filtering and or coalescing. The lower end of the moulded end cap is provided with a downwardly extending annular skirt 19 which is moulded of similar plastics material to the part 1 and provided with an internal helical thread 20 which is complimentary to the thread 3 of the mounting part 1 of FIG. 1. Additionally, radially outwardly of the skirt 19 there are provided diametrically oppositely located downwardly extending but circumferentially deflectable locating members 21. The lower ends 22 of these locating members are provided with a shape which is suitably engageable with the saw-tooth serrations of the track 4 when the member is screwed home to such a sufficient extent that the upper edge 5 of the part 1 is sealingly engageable with the resilient rubber annular sealing gasket 23 retained within the moulded end cap as shown.

The upper end of the generally cylindrical filter element is closed by a further moulded end cap (not shown) which can be of any suitable form but may if desired incorporate typically a hexagon to receive a tool for tightening the filter element into engagement with the mounting part by means of a tool only accessible from the end thereof before attachment of a closure member for closing of the filter chamber.

Referring to FIG. 3, in the part sectional view of the assembly shown therein it is seen that the mounting part 1 is mounted to a machine base plate 24 by means of a central mounting bolt 25, permitting access through a number of apertures such as 26 to the lower ends of passages 7 as seen in FIG. 1. The part 1 is sealed against effective fluid pressure against the plate 24 by an annular gasket 27 and becomes part of the machine itself, whereas the filter element is a replaceable component. The part 1 is normally mounted at the lower end of a generally cylindrical filter chamber access to which is gained from an opposite outer end which end, is normally closeable by a bolted-on closure plate. With the closure plate removed, the filter element can be screwed by rotation onto the mounting part 1 until engagement occurs between the upper edge 5 of the mounting part and the gasket 23. Before full engagement occurs appreciable resistance to rotation will be encountered by virtue of a prior engagement of the ends 22 locating members 21 with the serrations of the track 4 and further turning through a certain distance against increasing resistance will ensure that sealing engagement takes place between 5 and 23 and a substantial resisting force will be exerted by the resistance to bending of the locating members 21 which is necessary to permit unscrewing. Accordingly, when the filter is properly assembled, machine vibration is prevented from causing undesired unscrewing of the element even though the threaded portions of the filter and the mounting part are formed of a relatively soft plastic material. In the above described specific embodiment of the invention the locating member moves into closer proximity of the locating track as the screw threaded part is being screwed into its installation position and this introduces progressively increasing resistance to screwing together of the parts. This is because the track axially faces an approaching location part. In an altenative it may be arranged that the locating part faces the track in a radial direction rather than having such axial relationship.

In one alternative arrangement the locating track could be arranged to face radially outward around a cylindrical surface beneath the threaded portion of the mounting part to be engageable by a radially inwardly projecting locating member. In this case the resistance to relative unscrewing of the parts would not appreciably change at least whilst the locating part is engaging the track.

Figure 5:
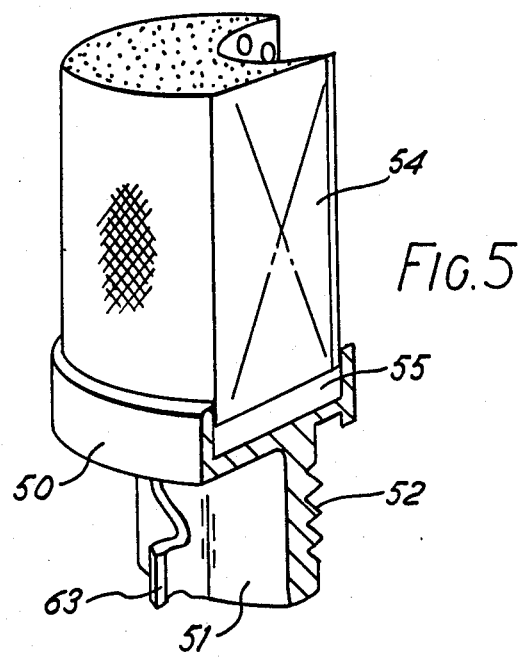

Alternatively, as shown in FIGS. 4 and 5, a locating track could be arranged to face radially inward around a cylindrical surface upstanding from the mounting part to be engageable by one or more radially outwardly pointing locating members of the mountable part. In FIG. 4. the mounting part again comprises a generally circular flange denoted by reference 41 with an upwardly extending generally cylindrical spigot 42 carrying a screw thread 43. The moulding is again of plastics and has an upward narrow sealing edge 45 and an aperture 46 and flow passages 47 as before. However, a locating track 44 is now provided on the inner surface of an upwardly extending cylindrical portion 48.

In FIG. 5 the mountable filter element 54 is substantially identical to that of FIG. 2 sealed at 55 into moulded lower mounting cap 50 with a downwardly extending annular skirt 51 moulded with an internal helical thread 52 which is complimentary to the thread 43 of the mounting part 41 of FIG. 4. Pointing radially outward of the skirt 51 are a pair of diametrically opposite deflectable locating members 53 the length of which is such as to enable positive engagement with the sawtooth serrations 44 during the last revolution or so of the screwing thereof before full sealing engagement of the two parts.

It will be understood that above specific examples of the invention are capable of modiciation whereby the locating track may be provided on the mountable part and the locating member may be provided on the mounting part. Again, in either example more than two suitably spaced locating members may be provided each being engageable with the locating track.

By virtue of the invention the locating member or members are made sufficiently stiff as to prevent loosening of the mountable part on the mounting part due to operational vibrations.

I claim:

1. An assembly of conjoined parts comprising a mounting part and a mountable part, said parts having complimentary means operable to conjoin them by relative rotation of the parts, wherein one of said parts is provided with at least one resiliently deflectble locating member engageable with a locating track of the other part to resist relative rotation and wherein said mountable part is part of a filter and a coalescer, and said mounting part is a base incorporating fluid flow passages therefrom.

2. An assembly as claimed in claim 1 wherein the locating track is provided with surface serrations with which the locating member is engageable.

3. An assembly as claimed in claim 1 wherein the or each locating member extends in a radial direction to engage the track.

4. An assembly as claimed in claim 1 wherein the or each locating member extends in an axial direction to engage the track.

5. An assembly as claimed in claim 3 wherein the locating member is carried by the mountable part and the track is carried by the mounting part.

6. An assembly as claimed in claims 1 wherein the track is provided with a plurality of serrations engageable by the locating member.

7. An assembly as claimed in claim 1 wherein complimentary means comprise integral screw threads on said parts.

8. An assembly as claimed in claim 1 wherein said mountable part comprises a plastic moulding.

9. Replaceable filter assembly for mounting on a mounting structure having a threaded spigot and a flange carrying an engagement surface, said filter assembly comprising a filter element, an end cap mounting on the end of said filter element, a circumferentially extending skirt projecting away from said end cap and defining an inner circumferentially surface, said inner circumferential surface being threaded to threadedly engage the threads on the spigot when the filter assembly is installed on the mounting structure, and a resilient, deflectable locating arm projecting from said end cap for engagement with said engagement surface when the filter assembly is installed on the mounting structure.

10. Replaceble filter assembly as claimed in claim 9, wherein said locating arm extends radially with respect to said filter element.

11. Replaceable filter assembly as claimed in claim 9, wherein said locating arm extends axially with respect to said filter element.

12. Replaceable filter assembly as claimed in claim 10, wherein said engagement surface is a serrated track.

13. Replaceable filter assembly as claimed in claim 11, wherein said engagement surface is a serrated track.

* * * * *